United States Patent
Gillis et al.

(10) Patent No.: US 6,783,088 B1
(45) Date of Patent: Aug. 31, 2004

(54) METHOD OF PRODUCING GLASS AND OF USING GLASS IN CUTTING MATERIALS

(76) Inventors: James Murray Gillis, 43626 U.S. Hwy. 41, Chassell, MI (US) 49916; Jiann-Yang Hwang, 44418 Old 41 Rd., Chassell, MI (US) 49916

( * ) Notice: Subject to any disclaimer, the term of this patent is extended or adjusted under 35 U.S.C. 154(b) by 0 days.

(21) Appl. No.: 10/082,843

(22) Filed: Feb. 27, 2002

(51) Int. Cl.[7] .............................................. B02C 19/12
(52) U.S. Cl. ........................... 241/19; 241/24.3; 241/29
(58) Field of Search ............................ 241/24.22, 24.3, 241/1, 301, 29, 19

(56) References Cited

U.S. PATENT DOCUMENTS

| | | |
|---|---|---|
| 5,535,933 A | 7/1996 | Dickerson |
| 5,558,565 A | 9/1996 | Dedonato |
| 5,857,398 A | 1/1999 | Bando |
| 5,871,134 A | 2/1999 | Komagata et al. |
| 5,931,071 A | 8/1999 | Mori |
| 5,950,936 A * | 9/1999 | Bergart .................. 241/21 |
| 6,202,530 B1 | 3/2001 | Cawley |
| 6,310,318 B1 | 10/2001 | Vetter et al. |
| 6,402,004 B1 | 6/2002 | Yoshikuni et al. |
| 6,446,886 B2 * | 9/2002 | Harada .................. 241/19 |

* cited by examiner

Primary Examiner—Mark Rosenbaum
(74) Attorney, Agent, or Firm—Bliss McGlynn, P.C.

(57) ABSTRACT

A method of producing glass as an abrasive media for cutting materials includes the steps of providing a glass feed stock and reducing the glass feed stock in size to produce glass particles with a high angularity and low aspect ratio. The method also includes the step of classifying the glass particles to remove at least one of coarses and fines. The method further includes the steps of size classifying the glass particles to produce an abrasive media with a predetermined size classification for use in abrasivejet cutting of materials.

12 Claims, 5 Drawing Sheets

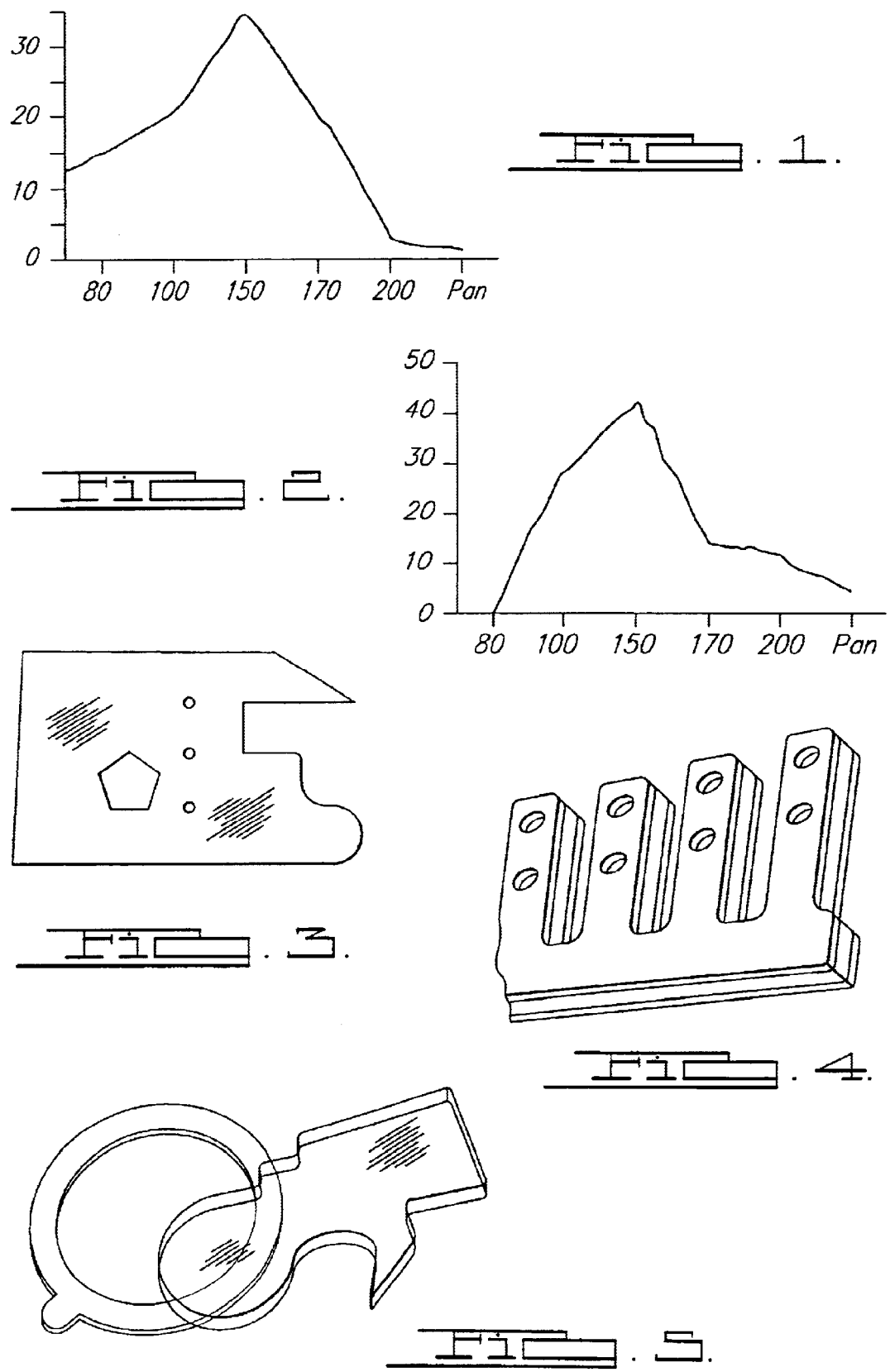

METHOD OF PRODUCING GLASS AND OF USING GLASS IN CUTTING MATERIALS

BACKGROUND OF THE INVENTION

1. Field of the Invention

The present invention relates generally to glass and, more specifically, to a method of producing glass as an abrasive media and using glass as an abrasive media in cutting materials.

2. Description of the Related Art

It is known to use a waterjet system to cut a very broad spectrum of materials ranging from difficult-to-machine materials such as high strength metal alloys, ceramics, rock, glass, and composites as well as softer materials such as wood, plastic, rubber, and paper. It is also known that the waterjet is one of the most diversified systems being used today. From the trimming of titanium turbine blades for jet engines to the packaging of food products, waterjet systems have been used to cut materials.

Although a significant portion of the applications utilizing waterjet systems use only water in the cutting of softer materials, the majority incorporate an abrasive head to entrain the stream of water with an abrasive, allowing much harder materials to be cut using an abrasivejet. With the stream of water serving as the carrier, the abrasive is entrained in a high-pressure stream of water in a mixing chamber and passed through a nozzle. The nozzle in turn serves to direct the resulting slurry onto a surface of the material being cut to produce a very thin kerf in which the slurry has essentially eroded the material as it makes its traverse.

The abrasives used in abrasivejet cutting fall under the largest class of minerals found on the surface of the earth, that is, the silicates. It is known that almandite of the garnet group and to a lesser extent quartz has proven to perform best when used in abrasivejet cutting. The physical properties associated with these minerals provide the characteristics found to be most desirable in the removal of material using an abrasive action. Their Mohs hardness are comparable, with garnet ranging from 6½ to 7½ and quartz most frequently being listed as 7. Their crystal structures are angular, providing very sharp edges that greatly assist in the removal of material. Furthermore, due to the nature of the hydro-abrasive erosional process, the entrained solids can be used to cut materials considerably harder than that of the abrasive. While the erosion of a ductile material results from micro shearing or a micro extrusion mechanism, the erosion of a brittle material involves the generation of microcracks and the intergranular failure of the grains.

Though the characteristics associated with quartz are comparable to those of garnet and the price of quartz is considerably less than the price of garnet, the primary concern with quartz over the years has been silicosis. Silicosis is a disease resulting from the inhalation of crystalline silica, which causes damage to the microphages of the lungs. According to the National Safety Council, the disease depends on several factors, the most significant factor being that the silica must be in crystalline form, as with quartz, to damage the lung's tissues. As a result, any studies related to the potential use of quartz as an abrasive media have in effect ceased.

Therefore, it is desirable to use glass as an abrasive media for cutting. It is also desirable to provide a method of producing glass for use as an abrasive media for cutting. It is further desirable to use glass as an abrasive media for a waterjet system in cutting materials. Thus, there is a need in the art for a method of producing glass and using glass in cutting materials that meets these desires.

SUMMARY OF THE INVENTION

Accordingly, the present invention is a method of producing glass as an abrasive media for cutting materials. The method includes the steps of providing a glass feed stock and reducing the glass feed stock in size to produce glass particles with a high angularity and low aspect ratio. The method also includes the step of classifying the glass particles to remove at least one of coarse particles and fine particles. The method further includes the steps of size classifying the glass particles to produce an abrasive with a predetermined size classification for use in abrasivejet cutting of materials.

In addition, the present invention is a method of using glass as an abrasive for cutting materials. The method includes the steps of providing glass particles as an abrasive media with a predetermined size classification. The method also includes the steps of entraining the abrasive media in a stream of water to produce a slurry, directing the slurry onto a surface of material to be cut, and eroding a portion of the material.

One advantage of the present invention is that a method is provided for producing glass as an abrasive media and of using glass as an abrasive media for cutting materials. Another advantage of the present invention is that the method produces and uses glass, which is a silicate, in an amorphous or non-crystalline form for cutting materials. Yet another advantage of the present invention is that the method eliminates the concern of silicosis, with crushed or fractured glass being cited as merely a nuisance dust by the Occupational Safety and Health Association (OSHA). Still another advantage of the present invention is that the method fractures glass and produces an abrasive of glass particles that are very angular, displaying sharp edges as well as conchoidal fractures. A further advantage of the present invention is that the method produces glass particles as an abrasive media that are similar to a garnet abrasive. Yet a further advantage of the present invention is that the method produces fractured glass as an abrasive media to provide an inexpensive alternative to garnet in those applications that involve materials comparable to, or harder than, glass. Still a further advantage of the present invention is that the method uses fractured glass as an abrasive media in abrasivejet cutting involving softer materials such as plastic, foams, textiles, etc.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1 is a graph of a garnet abrasive used as an abrasive media for cutting materials.

FIG. 2 is a graph of a glass abrasive used as an abrasive media produced by a method, according to the present invention, for cutting materials.

FIG. 3 is a view of a first material cut with a glass abrasive produced by a method, according to the present invention.

FIG. 4 is a view of a second material cut with a glass abrasive produced by a method, according to the present invention.

FIG. 5 is a view of a third material cut with a glass abrasive produced by a method, according to the present invention.

DESCRIPTION OF THE PREFERRED EMBODIMENT(S)

Figure 6:
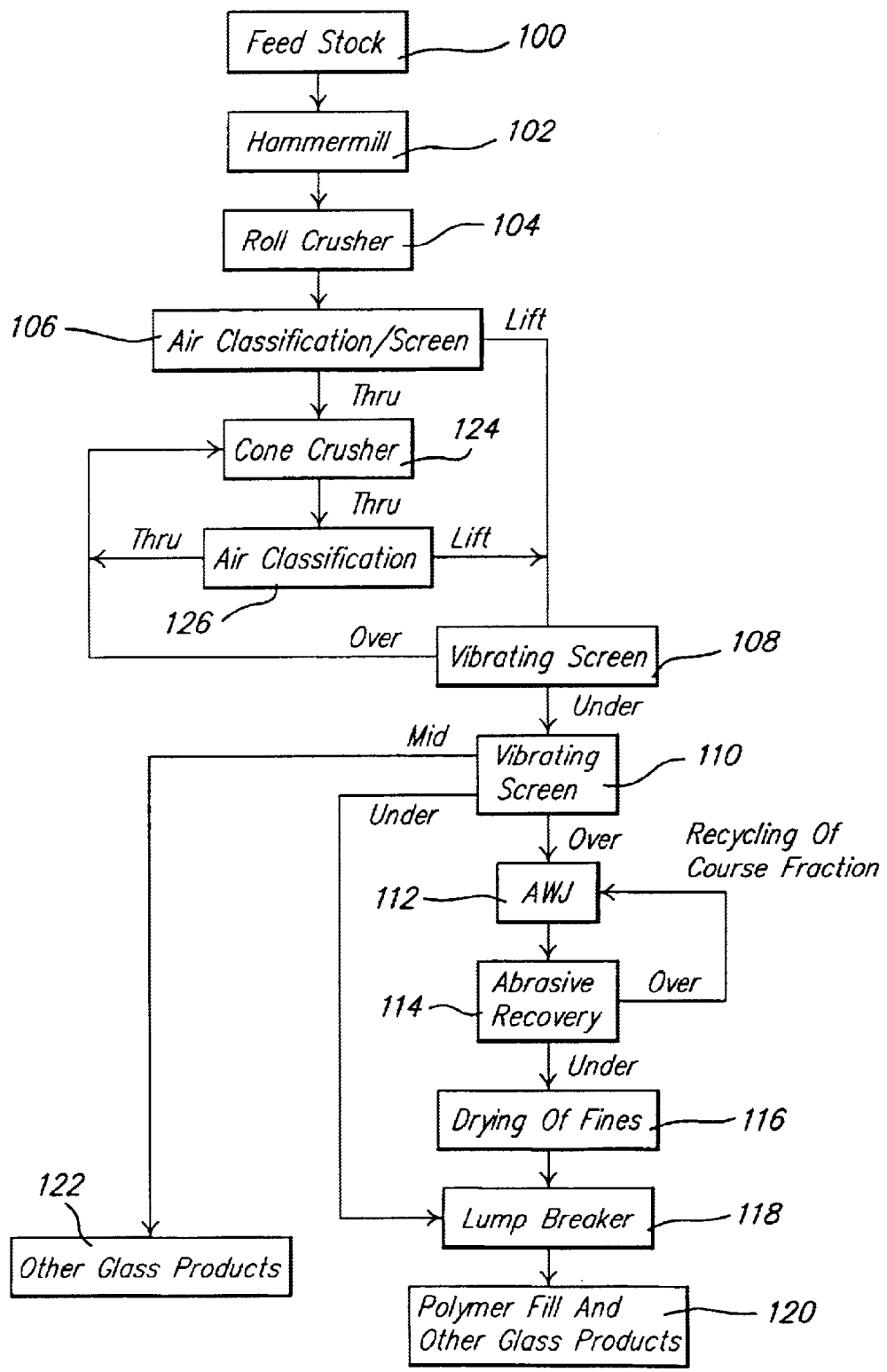
FIG. 6 is a flowchart of a first method, according to the present invention, of producing a glass abrasive.

One embodiment of a method, according to the present invention, of producing glass as an abrasive media for cutting materials is disclosed. In general, the method includes the steps of providing a glass feed stock and reducing the glass feed stock in size to produce particles with a high angularity, a low aspect ratio, while minimizing the attrition to produce glass particles that have maintained the sharp edges that resulted from the initial fracturing. The resulting stream of glass particles is in turn size classified by various size classification methods to remove fines and screened to produce an abrasive media with a variety of size classifications that is well suited for use as the abrasive media in abrasivejet cutting operations. It should be appreciated that the fines removed from the stream of glass particles by size classification may be further classified to produce a series of finer factions suited for use as a filler in various polymers and concretes, or as sintering aids. It should also be appreciated that the glass is silicate in an amorphous or non-crystalline form. It should further be appreciated that the coarses can be removed first and then remove the fines.

The method, according to the present invention, produces glass particles, using a broad spectrum of glass or glass waste streams as feed stock, which are suitable for use as an abrasive media in an abrasivejet cutting operation. The method produces glass particles with a low aspect ratio, high angularity, and sharp edges, while exhibiting a hardness comparable to garnet.

The method includes the step of providing a glass feed stock. For providing the glass feed stock, the requirements associated with feedstock are quite liberal, being able to accept glass in various forms and in a variety of shapes including plate glass, post-consumer glass, as well as other glass waste streams. It should be appreciated that the use of post consumer glass, as an abrasive media in abrasivejet cutting, requires no impurities that must be removed, as there are with mined abrasives, even the color of the glass has no effect on the resulting abrasive media. It should be appreciated that extensive tests were conducted using post consumer glass as the feed stock and the method not only produced a quality abrasive particle but was found to offer an efficient means of separating paper from the stream of fractured glass as a result of the air classification step. It should also be appreciated that the resulting abrasive media generated from the post consumer glass displayed a high quality glass particle, offering a uniform feed and very good edge quality on the materials being cut.

The method includes the step of reducing the glass feed stock. The initial or first stage size reduction of the glass feed stock is carried out by an impact crusher (not shown), such as a hammer mill (not shown), or other similar mill which is sized to accept a wide range of glass feed stock and in turn produce a stream of glass particles with a more uniform particle size such as one inch or smaller. A primary feature of the hammer mill is the ability to control the size of the discharged glass particle, offering a more tightly controlled glass size, through the insertion a perforated plate (not shown), which would restrict the passage of glass particles to a specific size such as one inch or smaller. It should be appreciated that there are a number of impact crushers employing various mechanisms that could be used in this initial phase of reduction. It should also be appreciated that most impact crushers employ a rotary breaker mechanism (not shown), providing a sharp fracture, for reduction while minimizing the attrition of the glass particles. It should further be appreciated that the impact crusher is conventional and known in the art.

After the initial size reduction, the step of reducing includes a second stage of size reduction that again involves a crushing phase. Although various types of crushing units may be used, preferably a roll crusher (not shown), a single rotor lump breaker (not shown), a jet mill (not shown), or a gyratory crusher (not shown) is used to provide the fracturing mechanism for this stage of size reduction. With the initial stage of reduction providing a more uniform size feed such as one inch or smaller, a roll crusher with a feeder (not shown) serves to control the rate at which the glass feed stock is being delivered to rolls (not shown) of the roll crusher to reduce the size of the glass feed stock to a size range such as one quarter inch or smaller, which is suitable for feed into a low aspect ratio cone crusher (not shown) to be described. It should be appreciated that the primary purpose of the controlled feed is to prevent choke feeding of the roll crusher and in turn reduce the abrasion of the sharp edges associated with the recently fractured glass particles. It should also be appreciated that the roll crusher is conventional and known in the art.

After the second stage, the step of reducing includes a tertiary stage of size reduction that again involves a crushing stage. Preferably, a cone crusher (not shown) is used for the final size reduction. This final stage of the size reduction of the glass feed stock is carried out using a low aspect ratio cone crusher (not shown) and again involves a feeding system (not shown) to control the rate at which the glass feed stock is fed into the cone crusher, to minimize the abrasion of as the result of attrition or inter-particle comminution. The throughput will in turn result in a glass media displaying the desired high angularity, sharp edges, and a relatively low aspect ratio such as 1.5 or less, yet varying greatly in size from approximately ten (10) mesh to approximately 1200 mesh (U.S. Mesh). It should be appreciated that the cone crusher is conventional and known in the art.

The method includes the step of classifying the glass particles by size classification. Size classification, involving either conventional screening, air classification, air tabling, wet slurry, sedimentation, or other gravitational separation is used to remove the fraction of glass particles, which are too fine in size such as four hundred (400) mesh to be used as an abrasive media in abrasivejet cutting. Preferably, an air classification system (not shown) is used to separate the various size fractions and includes a vertical chamber (not shown) with a stream of air running countercurrent to stream of crushed glass, which is introduced at the top of the chamber and allowed to fall vertically with minimal attrition. Adjustments are made to both the feed stream and airflow which result in a lifting of the finer fraction of glass particles, while the coarser fraction of the glass particles simply passes through and is discharged through the bottom of the chamber. The parameters, which determine whether a particle is lifted or allowed to fall, depend on the density, size, shape, and surface characteristics of the glass particle being introduced into the air stream. The finer fraction being removed from the primary stream of glass particles is, in turn, collected at the top of the air classification system and is set aside for further processing. It should be appreciated that removal of this finer fraction at this point would eliminate any additional attrition being caused by the excess fines, while also providing a source for an additional series of products. It should also be appreciated that the air classification system is conventional and known in the art.

The finer fraction would in turn serve as a feed stream to a pulverizer (not shown), such as a disk mill (not shown), which further reduces the glass particles down to a size that would be suitable for use as a filler in various products. A second stage of size classification is used to separate the finest fraction from this glass stream for use as a filler in a wide range of polymers where only fillers with particle size on the order of ten microns or less are used. It should be appreciated that, depending on the cuts to be made, additional stages may be included to increase the particle size distribution of each fraction.

The method includes the step of screening the glass particles to produce an abrasive media with a predetermined particle size classification for use in abrasivejet cutting of materials. The coarse fraction of glass particles that pass through the air classification system is, in turn, sized using conventional screening (not shown). This screening serves to separate the stream of glass particles into different size fractions such as sixty (60) mesh, eighty (80) mesh, one hundred (100) mesh, one hundred twenty (120) mesh, one hundred seventy (170) mesh, two hundred (200) mesh, two hundred thirty (230) mesh, etc., to be packaged as different classes of abrasive media, and also removes the oversize fraction from this stream of glass particles. It should be appreciated that different particle sizes can be combined at various proportions for different products as well. It should also be appreciated that the oversize fraction is recirculated back and blended in with the glass feed stock to the low aspect ratio cone crusher or tertiary stage of crushing for further size reduction.

An alternative is to first air classify or screen the coarse glass for recirculation. Then air classify or screen the products or the fines. It should be appreciated that crushing is not necessary in three stages because the second and third stages may be combined by controlling the crushing conditions.

Accordingly, one embodiment of a method, according to the present invention, of using glass as an abrasive media for cutting materials is disclosed. In general, the method includes the steps of providing glass particles as an abrasive media with a predetermined size classification and entraining the abrasive media in a stream of water to produce a slurry. The method also includes the steps of directing the slurry onto a surface of material to be cut and eroding a portion of the material.

The method includes the step of providing glass particles as an abrasive media with a predetermined size classification. The size of the particles used in abrasivejet cutting typically range from a coarse 20 mesh (U.S. Mesh) to a fine 400 mesh. In abarasivejet cutting the particle size has a considerable impact on its cutting performance. A fine abrasive, which produces a better surface finish, requires a slower feed rate than a coarse abrasive. While a coarse abrasive can cut the same material much faster, the result is a much coarser finish. As a result, there are designations given to each of the primary size ranges used in different applications. The most common size ranges center around 80, 120, and 170 mesh. It should be appreciated that each size range is actually a range of particle sizes centered around the designated size fraction, yet the narrower the range the more appropriate the abrasive is for abrasivejet cutting.

The method also includes the step of entraining the abrasive media in a stream of water to produce a slurry utilizing a waterjet system (not shown). The waterjet system includes an abrasive head (not shown) to entrain a stream of water with the abrasive media to form an abrasivejet. With the stream of water serving as the carrier, the abrasive media is entrained in a high-pressure stream of water in a mixing chamber (not shown) of the waterjet system and passed through a nozzle (not shown). The nozzle, in turn, serves to direct the resulting slurry onto a surface of the material being cut to produce a very thin kerf in which the slurry has essentially eroded the material as it makes its traverse. It should be appreciated that other abrasive media, for example garnet, alumina, etc., can be mixed with the glass if desired. It should also be appreciated that the waterjet system is conventional and known in the art.

A sieve analysis was run on a commercially produced garnet abrasive centered around 120 mesh and a glass abrasive centered around 120 mesh with the results being displayed in FIGS. 1 and 2, respectfully. As indicated by the resulting bar charts in FIGS. 1 and 2, it can seen that not only is the glass abrasive media centered around the appropriate size fraction but clearly offers a narrower range which would offer superior performance as an abrasive in abrasivejet cutting.

EXPERIMENTAL

Aspects of the present invention will now be illustrated, without intending any limitation, by the following examples. Unless otherwise indicated, all parts and percentages are by weight. The abrasives described above have been used in the abrasivejet cutting of a wide variety of materials. The following examples illustrate the fractured glass as an abrasive media in applications which do not require the extreme hardness offered by garnet, while providing the abrasive required in abrasivejet cutting at a significant cost advantage.

EXAMPLE 1

Plate glass scraps obtained from a waste stream generated from an automotive glass manufacturing facility were processed to generate an abrasive centered around 80 mesh. The method used to reduce the plate glass involved a hammer mill, a roll crusher, and low aspect ratio cone crusher as the primary, secondary and tertiary stages of crushing, respectively. The resulting stream of glass particles was then classified with the 80 mesh and the 120 mesh size fractions being separated for use as an abrasive media in a series of abrasivejet cutting tests.

This stream of 80 mesh was used as the abrasive media in the abrasivejet cutting of automotive glass. The results were very successful (FIG. 3) offering an edge quality that could reduce the necessity for further grinding of the resulting edge, which is required when using the scoring/flame breakout process, which is presently used in the automotive industry to cut glass. There were additional advantages over the existing conventional process including the absence of residual stresses in the matrix of the glass being cut, generated by the scoring/flame breakout process, which must in turn be ground away, requiring additional steps.

Most notable were the design restrictions dictated by the scoring/flame breakout process, with regard to minimal radius, concave patterns, and piercing, which would not be imposed when using abrasivejet cutting. Abrasivejet cutting of glass imposes no minimum radius, in fact, it allows one to incorporate comers displaying acute angles in the resulting product. The nozzle can follow a concave or convex path as easily as a straight line to produce a either a squared edge or inclined surface on the part being cut. Furthermore piercing can be carried out in the same step with no additional tooling or fixtures being required.

EXAMPLE 2

An abrasive media produced by the method described in Example 1, with a particle size range centered around 80 mesh, was used as the abrasive media in the abrasivejet cutting of a multi-layer plywood, with the results being very successful (FIG. 4). The abrasivejet cutting of the wood fiber offered a number of advantages over the conventional method used to cut this class of composites. The most unique feature realized when using the glass abrasive media of the present invention to cut wood fiber was the resulting surface finish, left by the abrasivejet. The wood was not only cut but also in essence had been sanded at the same time to produce a surface which appears to have been sanded smooth with a fine grain sandpaper. The thin kerf, which resulted from the use of the glass abrasive media of the present invention, also allowed for a considerable amount of detail to be introduced, providing greater flexibility than is possible with conventional tooling. A hole, which would traditionally be drilled, can be pierced by an abrasivejet with a diameter of 0.030" and then be programmed to trace the circumference to produce the same hole. With such detail resulting from the use of an abrasivejet to cut wood, it is readily apparent that there are a number of advantages in using an abrasivejet over conventional methods in the production of a wide variety of wood products.

EXAMPLE 3

Polymers are another class of materials, which benefit from the use of the glass abrasive media of the present invention in the abrasivejet cutting. With plastics being relatively soft material the need for the hardness associated with garnet is well beyond the required hardness to produce a quality cut using the abrasivejet process. Using an abrasive product centered around 120 mesh, produced using the method described in Example 1, various designs were cut from a piece of acrylic sheet, composites, and glass reinforced substrate used in the production of circuit boards as well as many other polymers (FIG. 5). The resulting edge displayed qualities, which indicated that there was no elevation in the temperature of the parent material as a result of the cutting using an abrasivejet, which is a concern when machining polymers using conventional methods.

EXAMPLE 4

An glass abrasive with a particle size range centered around 80 mesh, produced using the method described in Example 1 has also been used in the abrasivejet cutting of 6061 aluminum plate. With 6061 aluminum being a relatively soft metal the abrasive proved to be well suited to this application which involved a 51 8"deep cut at a 600 incline and resulted in an excellent edge quality. The cutting of the aluminum with the abrasivejet involved very extensive pathways as well as piercing of the plate in a number of locations, all of which displayed surfaces with excellent edge quality.

Referring to FIG. 6, a first method, according to the present invention, is shown for production of glass abrasive. In this embodiment, the method uses screening/air classification to remove glass product and fines and incorporates a roll crusher. The method begins in block 100 by providing a feed stock of glass. The method advances to block 102 and reduces the feed stock in a hammermill. The method advances to block 104 and roll crushes the reduced feed stock. The method advances to block 106 and either air classifies or screens the crushed glass. For lighter glass particles, the method advances to block 108 and uses a vibrating screen to separate glass particles. For the glass particles that are undersized, the method advances to block 110 and uses a vibrating screen to separate the undersized glass particles. For the glass particles that are oversized, the method advances to block 112 and uses the abrasive waterjet (AWJ). The method advances to block 114 and performs abrasive recovery on the glass particles. For oversized glass particles, the method advances to block 112 previously described. For undersized glass particles, the method advances to block 116 and dries the fines. The method advances to block 118 and uses a lump breaker on the fines. The method advances to block 120 and uses the fines as polymer fill and other glass product.

In block 110, for undersized glass particles, the method advances to block 118 previously described. The glass particles are broken further and the method advances to block 120 and uses the fines as polymer fill and other glass product.

In block 110, for midsized glass particles, the method advances to block 122 and uses the midsized glass particles for other glass products. It should be appreciated that these glass particles are used as the glass abrasive.

In block 106, for the heavier glass particles, the method advances to block 124 and uses a cone crusher on the glass particles. The method advances to block 126 and uses air classification on the glass particles. For the heavier glass particles, the method advances to block 124 previous described to be recrushed. For the lighter glass particles, the method advances to block 108 previous described for separation. It should be appreciated that, for the oversized glass particles in block 108, the method advances to block 124 previously described to be recrushed.

Figure 7:
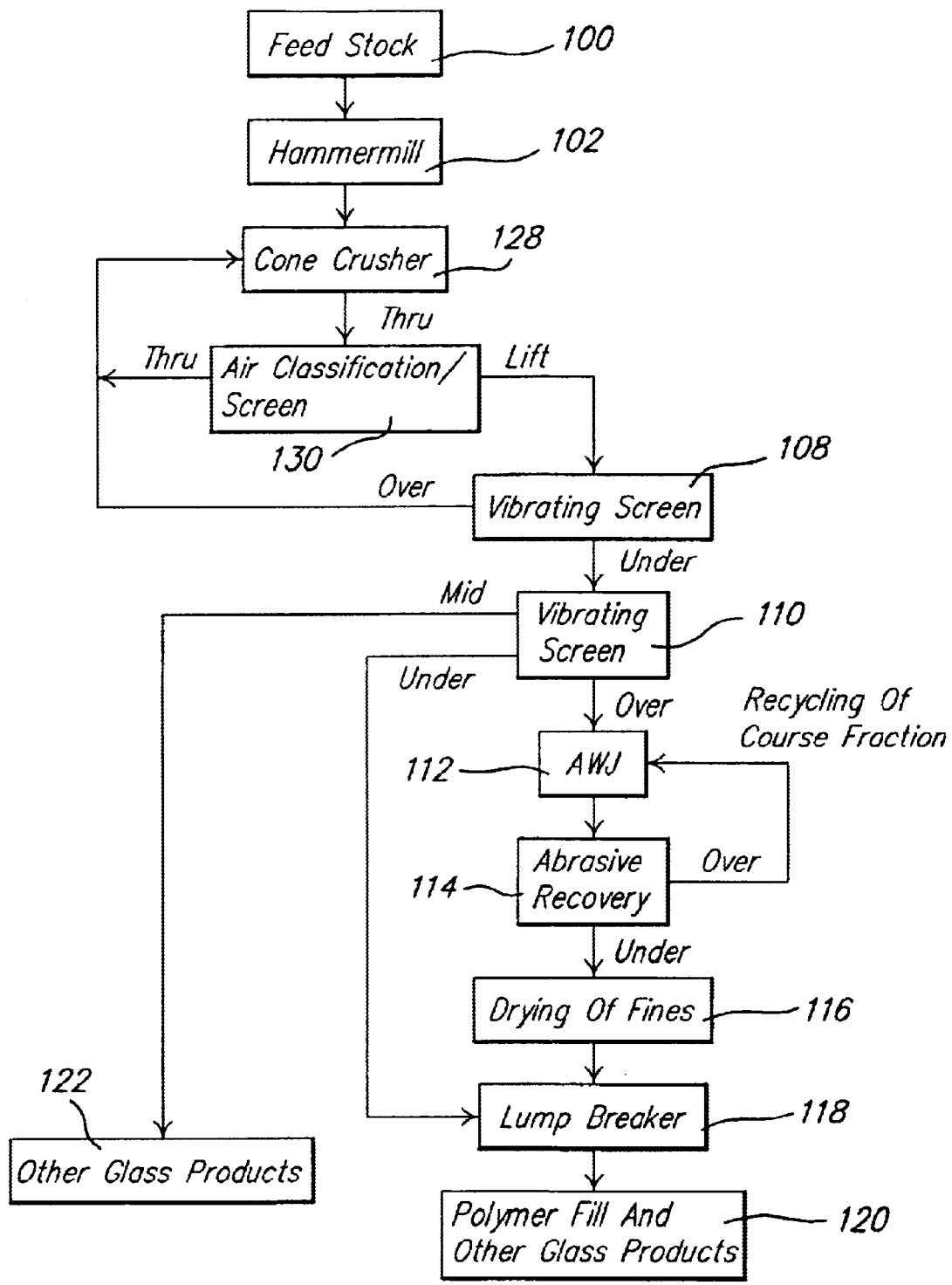
FIG. 7 is a flowchart of a second method, according to the present invention, of producing a glass abrasive.

Referring to FIG. 7, a second method, according to the present invention, is shown for the production of glass abrasive. Like steps of FIG. 6 have like reference numerals. In this embodiment, the method uses screening/air classification to remove glass product and fines. The method begins in block 100 by providing a feed stock of glass. The method advances to block 102 and reduces the feed stock in a hammermill. The method advances to block 128 and uses a cone crusher on the reduced glass. The method advances to block 130 and uses air classification or screening to separate the glass particles. For the heavier glass particles, the method advances to block 128 to be recrushed. For the lighter glass particles, the method advances to block 108 and uses a vibrating screen to separate glass particles. For the glass particles that are undersized, the method advances to block 110 and uses a vibrating screen to separate the undersized glass particles. For the glass particles that are oversized, the method advances to block 112 and uses the abrasive waterjet (AWJ). The method advances to block 1 14 and performs abrasive recovery on the glass particles. For oversized glass particles, the method advances to block 112 previously described. For undersized glass particles, the method advances to block 116 and dries the fines. The method advances to block 118 and uses a lump breaker on the fines. The method advances to block 120 and uses the fines as polymer fill and other glass product.

In block 110, for undersized glass particles, the method advances to block 118 previously described. The glass particles are broken further and the method advances to block 120 and uses the fines as polymer fill and other glass product.

In block 110, for midsized glass particles, the method advances to block 122 and uses the midsized glass particles for other glass products. It should be appreciated that these glass particles are used as the glass abrasive.

Figure 8:
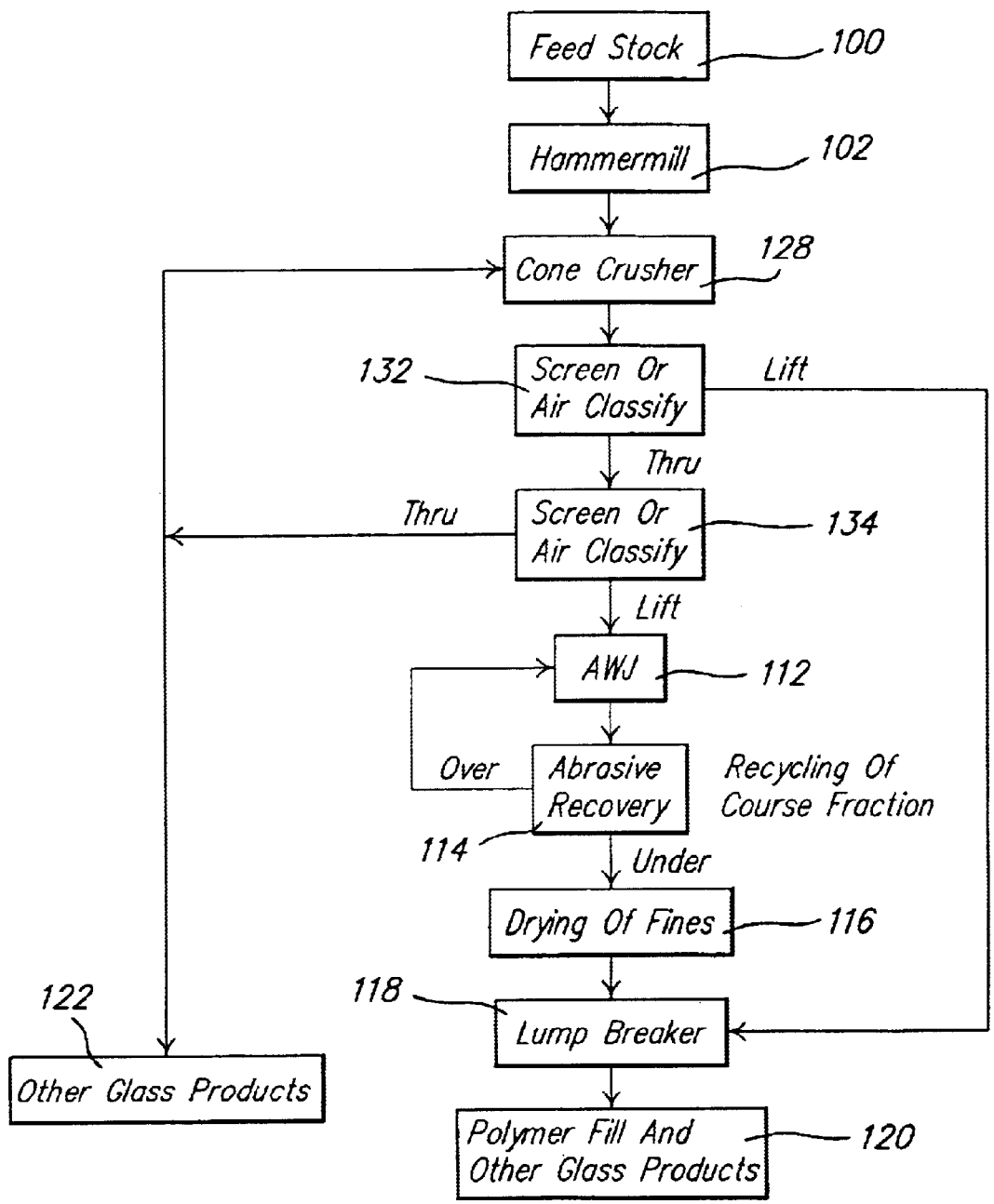
FIG. 8 is a flowchart of a third method, according to the present invention, of producing a glass abrasive.

Referring to FIG. 8, a third method, according to the present invention, is shown for the production of glass abrasive. Like steps of FIG. 6 have like reference numerals. In this embodiment, the method uses screening/air classification to remove fines only. The method begins in block 100 by providing a feed stock of glass. The method advances to block 102 and reduces the feed stock in a hammermill. The method advances to block 128 and uses a cone crusher on the reduced glass. The method advances to block 132 and screens or air classifies the crushed glass to separate the glass particles. For the heavier glass particles, the method advances to block 134 and screens or air classifies the glass particles to separate the glass particles. For the heavier glass particles, the method advances to block 128 to be recrushed or to block 122 and uses the glass particles for other glass products. It should be appreciated that these glass particles are used as the glass abrasive.

In block 134, for the lighter glass particles, the method advances to block 112 and uses the abrasive water jet (AWJ). The method advances to block 114 and performs abrasive recovery on the glass particles. For oversized glass particles, the method advances to block 112 previously described. For undersized glass particles, the method advances to block 116 and dries the fines. The method advances to block 118 and uses a lump breaker on the fines. The method advances to block 120 and uses the fines as polymer fill and other glass product.

In block 132, for the lighter glass particles, the method advances to block 118 previously described. The glass particles are broken further and the method advances to block 120 and uses the fines as polymer fill and other glass product.

Figure 9:
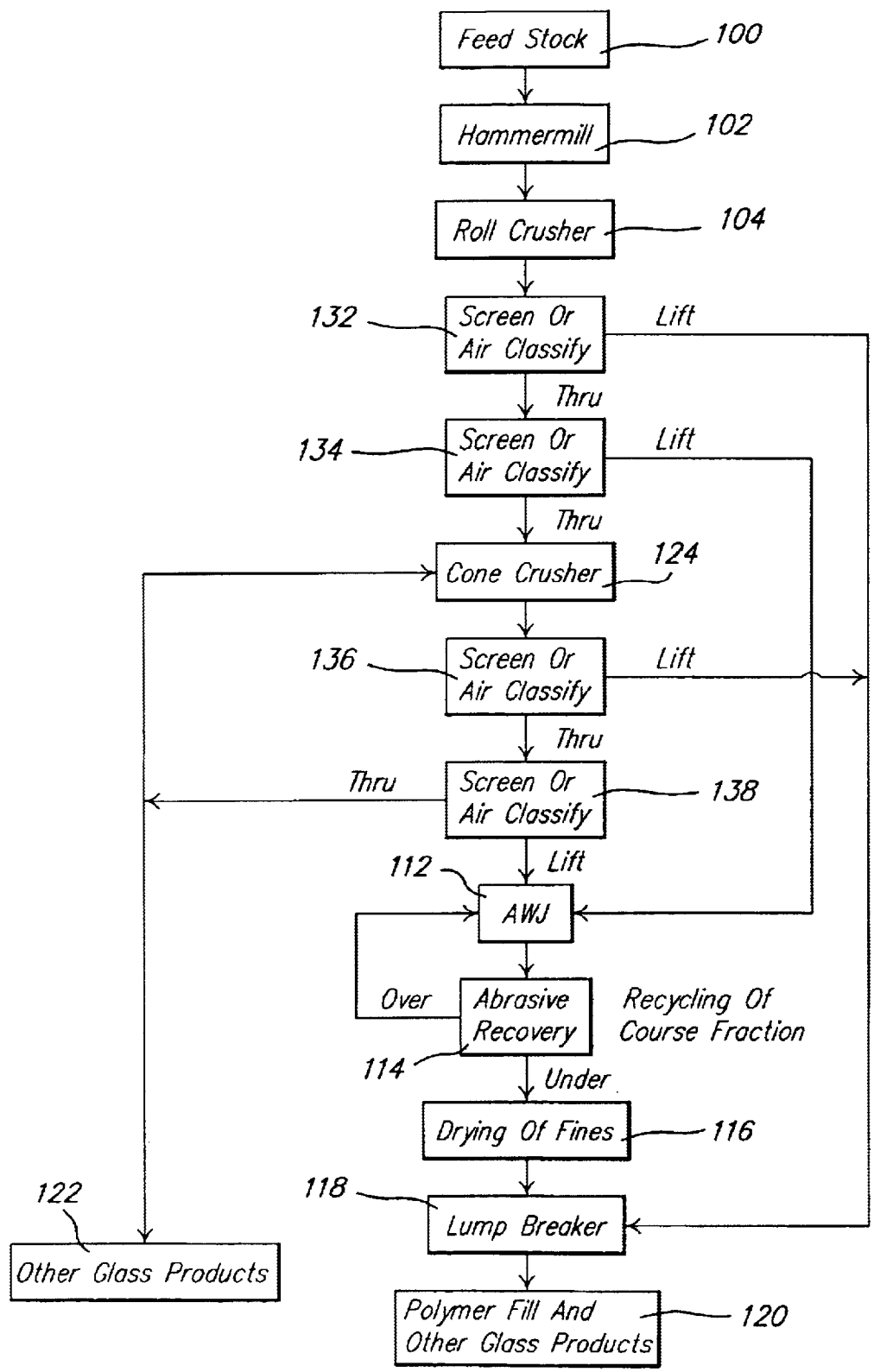
FIG. 9 is a flowchart of a fourth method, according to the present invention, of producing a glass abrasive.

Referring to FIG. 9, a fourth method, according to the present invention, is shown for the production of glass abrasive. Like steps of FIG. 6 have like reference numerals. In this embodiment, the method uses screening/air classification to remove fines only and incorporates a roll crusher. The method begins in block 100 by providing a feed stock of glass. The method advances to block 102 and reduces the feed stock in a hammermill. The method advances to block 104 and roll crushes the reduced feed stock. The method advances to block 132 and screens or air classifies the crushed glass to separate the glass particles. For the heavier glass particles, the method advances to block 134 and screens or air classifies the glass particles to separate the glass particles. For the heavier glass particles, the method advances to block 124 and uses a cone crusher on the glass particles. The method advances to block 136 and screens or air classifies the crushed glass to separate the glass particles. For the heavier glass particles, the method advances to block 138 and screens or air classifies the glass particles to separate the glass particles. For the heavier glass particles, the method advances to block 124 to be recrushed or to block 122 and uses the glass particles for other glass products. It should be appreciated that these glass particles are used as the glass abrasive.

For the lighter glass particles in block 134 and 138, the method advances to block 112 and uses the abrasive water jet (AWJ). The method advances to block 114 and performs abrasive recovery on the glass particles. For oversized glass particles, the method advances to block 112 previously described. For undersized glass particles, the method advances to block 116 and dries the fines. The method advances to block 118 and uses a lump breaker on the fines. The method advances to block 120 and uses the fines as polymer fill and other glass product.

In block 132, for the lighter glass particles, the method advances to block 118 previously described. The glass particles are broken further and the method advances to block 120 and uses the fines as polymer fill and other glass product.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A dry method of producing glass as an abrasive media for cutting materials, said method comprising the steps of:

providing a glass feed stock;

reducing the glass feed stock in size to produce glass particles with a high angularity and low aspect ratio and sharp edges;

classifying the glass particles to remove at least one of coarses and fines; and size classifying the glass particles to produce an abrasive media with a predetermined size classification and sharp edges for use in abrasivejet cutting of materials.

2. A method as set forth in claim 1 wherein said classifying comprises removing fines from a stream of the glass particles by air classification.

3. A method as set forth in claim 1 wherein said step of reducing comprises fracturing the glass feed stock.

4. A method as set forth in claim 1 wherein said step of reducing comprises crushing the glass feed stock and producing glass particles with sharp edges.

5. A method as set forth in claim 1 wherein said step of reducing includes a first stage size reduction of the glass feed stock to a first predetermined size.

6. A method as set forth in claim 5 wherein said first stage size reduction uses an impact crusher.

7. A method as set forth in claim 5 wherein said step of reducing includes a second stage size reduction of the glass feed stock to a second predetermined size.

8. A method as set forth in claim 7 wherein said second stage size reduction uses a roll crusher.

9. A method as set forth in claim 7 wherein said step of reducing includes a third stage size reduction of the glass feed stock to a third predetermined size.

10. A method as set forth in claim 9 wherein said third stage size reduction uses a cone crusher.

11. A method of producing glass as an abrasive media for cutting materials, said method comprising the steps of:

providing a glass feed stock;

reducing the glass feed stock in size to produce glass particles with a high angularity and low aspect ratio and sharp edges;

classifying the glass particles to remove at least one of coarses and fines; and size classifying the glass particles to produce an abrasive media with a predetermined size classification and sharp edges.

12. A method of producing glass as an abrasive media for cutting materials, said method comprising the steps of:

providing a glass feed stock;

reducing the glass feed stock in size to produce glass particles with a high angularity and low aspect ratio and sharp edges;

classifying the glass particles to remove at least one of coarses and fines; and size classifying the glass particles by air classification to produce an abrasive media with a predetermined size classification and sharp edges for use in abrasivejet cutting of materials.

* * * * *